(12) United States Patent
Kadokawa

(10) Patent No.: US 7,652,966 B2
(45) Date of Patent: Jan. 26, 2010

(54) INFORMATION RECORDING METHOD AND APPARATUS, INFORMATION REPRODUCING METHOD AND APPARATUS, AND RECORDING MEDIUM

(75) Inventor: Yuichi Kadokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 663 days.

(21) Appl. No.: 11/259,274

(22) Filed: Oct. 27, 2005

(65) Prior Publication Data

US 2006/0077829 A1   Apr. 13, 2006

Related U.S. Application Data

(63) Continuation of application No. PCT/JP2004/003401, filed on Mar. 15, 2004.

(30) Foreign Application Priority Data

Apr. 30, 2003  (JP) ............... 2003-125947
Sep. 2, 2003   (JP) ............... 2003-310162

(51) Int. Cl.
   *G11B 7/00* (2006.01)
(52) U.S. Cl. .................. 369/59.25; 369/59.24
(58) Field of Classification Search ............. None
   See application file for complete search history.

(56) References Cited

U.S. PATENT DOCUMENTS

| 4,845,575 A | 7/1989 | Wahler |
| 5,051,998 A | 9/1991 | Murai et al. |
| 5,428,648 A | 6/1995 | Fukuda |
| 5,596,559 A | 1/1997 | Hiramatsu |
| 6,091,682 A * | 7/2000 | Hikima ................ 369/47.2 |
| 6,282,163 B1 | 8/2001 | Fujiwara |
| 6,771,893 B1 * | 8/2004 | Okamoto et al. ........ 386/124 |
| 2003/0182606 A1 * | 9/2003 | Watanabe .............. 714/719 |
| 2004/0100883 A1 * | 5/2004 | Sakagami ............ 369/47.35 |

FOREIGN PATENT DOCUMENTS

| EP | 1 096 491 A1 | 5/2001 |
| JP | 01-133269 | 5/1989 |
| JP | 02-010574 | 1/1990 |
| JP | 04-219626 | 8/1992 |
| JP | 06-104741 | 4/1994 |
| JP | 07-320419 | 12/1995 |
| JP | 10-255409 | 9/1998 |
| JP | 2000-311448 | 11/2000 |
| JP | 2002-216424 | 8/2002 |
| JP | 2002-260345 | 9/2002 |
| WO | WO 03/009289 A2 | 1/2003 |

* cited by examiner

*Primary Examiner*—Joseph H Feild
*Assistant Examiner*—Joseph Haley
(74) *Attorney, Agent, or Firm*—Dickstein Shapiro LLP

(57) ABSTRACT

A clock mark for extracting a clock when reproducing information from a recording medium and a synchronization mark for detection a bit-slip are recorded so that a part of the synchronization mark is identical to a pattern of the clock mark. A bit-slip detection and a clock detection are performed simultaneously with a single mark by multi-value recording.

11 Claims, 14 Drawing Sheets

| SYNC MARK CLOCK MARK | DATA | CLOCK MARK | DATA | CLOCK MARK | DATA | CLOCK MARK |

INFORMATION RECORDING METHOD AND APPARATUS, INFORMATION REPRODUCING METHOD AND APPARATUS, AND RECORDING MEDIUM

CROSS-REFERENCE TO RELATED APPLICATIONS

This application is a U.S. continuation application filed under 35 U.S.C. 111(a) claiming benefit under 35 U.S.C. 120 and 365(c) of PCT application JP2004/003401, filed Mar. 15, 2004, which claims priority to Applications Ser. No. 2003-125947, filed in Japan on Apr. 30, 2003 and Ser. No. 2003-310162 filed in Japan on Sep. 2, 2003. The foregoing applications are hereby incorporated herein by reference.

BACKGROUND OF THE INVENTION

1. Field of the Invention

The present invention relates to information recording and reproducing techniques and, more particularly, to an information recording method and apparatus of a multi-value level type for recording information on a computer-readable recording medium, and to a computer-readable recording medium on which information is recorded by such a recording method.

2. Description of the Related Art

In recent years, a CD-R disc, a CD-RW disc, a DVD+R disc, a DVD+RW disc, etc., have become popular as a computer-readable information recording medium. Generally, when reproducing information recorded on such an information recording medium, a clock signal and a synchronization signal are acquired by detecting clock marks and synchronization marks recorded on the information recording medium.

Conventionally, with respect to the clock extraction and the synchronization signal, a bit stream is converted into bytes correctly, even if there is a bit-slip generated due to a defect on the bit stream, so as to prevent generation of excessive data error (For example, refer to Japanese Laid-Open Patent Application No. 7-320419).

Additionally, with respect to necessity of the clock marks in the case of multi-value recording, there are provided a multi-value data part in which multi-value information is recorded and a bit part in which synchronization bits are recorded to generate a demodulation clock for acquiring a timing for reproducing the multi-value information recording in the multi-value data part so as to generate said demodulation clock from an electric signal corresponding to said synchronization bits and detect a signal level of the electric signal corresponding to said multi-value information by being synchronized with the demodulation clock (for example, refer to Japanese Laid-Open Patent Application No. 4-219626 (Japanese Patent No. 2914732)).

When information is recorded on a recording medium at a multi-value level, since it is difficult to extract a clock from a reproduction signal, marks exclusive for extracting the clock on the recording medium are recorded on the recording medium. At the time of reproduction, since the interval of the clock marks fluctuates due to fluctuation in rotation of the recording medium, marks having a larger window width than the fluctuation are needed. Moreover, marks that do not generate erroneous synchronization are needed within the window width, and synchronization marks for recovering a bit-slip generated by a defect or the like are necessary synchronization marks. Since the fluctuation of the synchronization marks is larger than the clock marks, a larger window is needed.

Moreover, if a signal defect causing a bit-slip is generated actually, the phase of the clock shifts greatly and the reliability of the signal is spoiled greatly. Thus, in order to match the phase of the clock, in the conventional method, the phase is gradually matched using a plurality of clock marks. Therefore, there is a possibility of error occurring in reproduction data until phase synchronization is acquired even after the signal is recovered.

Moreover, in a case of binary recording, since the clock can be extracted from the reproduction signal, it is possible to pull-in the clock automatically when the reproduction signal is recovered even if the reproduction signal is temporarily missed. However, in the multi-value recording, there is a problem in that a time until the phase is pulled-in becomes long as mentioned above.

SUMMARY OF THE INVENTION

It is a general object of the present invention to provide an improved and useful information recording and reproducing technique in which the above-mentioned problems are eliminated.

A more specific object of the present invention is to provide an information recording and reproducing technique which can reduce a degree of redundancy by performing simultaneously a bit-slip detection and a clock detection using a single mark.

It is another object of the present invention to provide an information recording and reproducing technique which can rapidly recover a phase misalignment of a clock due to an error such as signal missing.

In order to achieve the above-mentioned objects, there is provided according to one aspect of the present invention an information recording method for recording information, a clock mark and a synchronization signal on a recording medium, the clock mark for extracting a clock when reproducing the information, the synchronization mark for detecting a bit-slip on a recording medium, so that a part of the synchronization mark is identical to a pattern of the clock mark.

According to the above-mentioned recording method, by making a part of the synchronization mark to be the same shape as the clock mark, the bit-slip detection and the clock detection can be performed simultaneously with a single mark.

There is provided according to another aspect of the present invention an information reproducing method for reproducing, from a recording medium on which information, a clock mark and a synchronization signal are recorded, the clock mark for extracting a clock when reproducing the information, the synchronization mark for detecting a bit-slip on a recording medium, so that a part of the synchronization mark is identical to a pattern of the clock mark, the information based on the synchronization signal and the clock mark, and detecting the bit-slip by the synchronization mark and also performing a synchronization detection of the clock.

According to the above-mentioned information reproducing method, a redundancy can be reduced by performing the bit-slip detection and the clock detection simultaneously with a single mark.

In the above-mentioned information recording method, it is preferable that recording is performed so that a position of the clock mark in the synchronization mark and positions of other clock marks are at equal interval. Additionally, in the above-mentioned information recording method, the information may be recorded by multi-value information so that the clock mark is made as a combination of a first level and a second level, the first level causing a reproduction signal to be largest, the second level causing the reproduction signal to be smallest. Additionally, in the above-mentioned information recording method, it is preferable that recording is performed so that the same level continues for equal to or more than two pieces in beginning and ending of the clock mark. Further, in the above-mentioned information recording method, an error may be corrected using two kinds of error correction codes of a first and a second, information may be recorded in a direction of an error correction according to the first error correction code, and the synchronization mark may be recorded in a portion corresponding to a head part of the second error correction code.

Additionally, there is provided according to another aspect of the present invention an information recording apparatus for recording on a recording medium by an information recording method for recording information, a clock mark and a synchronization signal on a recording medium, the clock mark for extracting a clock when reproducing the information, the synchronization mark for detecting a bit-slip on a recording medium, so that a part of the synchronization mark is identical to a pattern of the clock mark, the information recording apparatus comprising means for recording the clock mark and the synchronization mark in said information.

According to the above-mentioned information recording apparatus, by making a part of the synchronization mark to be the same shape as the clock mark, the bit-slip detection and the clock detection can be performed simultaneously with a single mark.

Additionally, there is provided an information reproducing apparatus for reproducing a recording medium recorded by an information recording method for recording information, a clock mark and a synchronization signal on a recording medium, the clock mark for extracting a clock when reproducing the information, the synchronization mark for detecting a bit-slip on a recording medium, so that a part of the synchronization mark is identical to a pattern of the clock mark, the information reproducing apparatus comprising means for detecting a bit-slip by the synchronization mark and also performing a synchronization detection of a clock when reproducing the recording medium having information in which the clock mark and the synchronization mark are recorded in the information.

According to the above-mentioned information reproducing apparatus, a redundancy can be reduced by performing the bit-slip detection and the clock detection simultaneously with a single mark.

The above-mentioned information reproducing apparatus may comprise means for separately providing a window for detecting the bit-slip and a window for the synchronization detection of the clock.

Additionally, there is provided according to another aspect of the present invention a computer-readable recording medium on which data having a structure comprising a clock mark and a synchronization mark that are recording on said recording medium by the above-mentioned information recording method.

According to the above-mentioned computer-readable recording medium, by making a part of the synchronization mark to be the same shape as the clock mark, the bit-slip detection and the clock detection can be performed simultaneously with a single mark.

Additionally, there is provided according to another aspect of the present invention an information recording method for recording information on a recording medium at a multi-value level, comprising recording information, a clock mark, a synchronization signal, and a synchronization pull-in mark on a recording medium when recording said information on the recording medium, the clock mark for extracting a clock when reproducing the information, the synchronization mark for detecting a bit-slip on a recording medium, the synchronization pull-in mark for pulling in a phase synchronization at a position immediately after the synchronization mark.

According to the above-mentioned information recording method, the synchronization pull-in mark for pulling in the synchronization mark is recorded immediately after the synchronization mark. Thereby, if a clock phase deviation is generated when reproducing, the phase deviation can be recovered early by using the synchronization pull-in mark. Therefore, an error due to signal missing can be suppressed at minimum.

In the above-mentioned information recording method, it is preferable that the clock mark and the synchronization mark are recorded so that a part of the synchronization mark is identical to a pattern of the clock mark. In this case, a redundancy can be reduced by performing the bit-slip detection and the clock detection simultaneously with a single mark. Therefore, it is advantageous in adding the synchronization pull-in mark.

Additionally, in the above-mentioned information recording method, the synchronization pull-in mark may be recorded as a combination pattern of a first level at which a reproduction signal is maximized and a second level at which the reproduction signal is minimized. In this case, a signal can be easily detected and is caused to hardly receive influence of noise or the like, which enables achieving a reliable synchronization pull-in.

In the above-mentioned information recording method, the combination patter of the synchronization pull-in mark may be a pattern having the first levels or the second levels provided therebetween with a plurality of pieces of the other of first level or the second level. Additionally, the plurality of pieces among the combination patterns of the synchronization pull-in mark may be a number that does not cause an amplitude reduction due to an inter-code interference. In this case, a reduction in amplitude due to an inter-code interference can be prevented, thereby enabling achievement of a reliable synchronization pull-in.

Additionally, in the above-mentioned information recording method, it is preferable to correct an error using a first error correction codes and a second error correction code, record information in a direction according to the first error correction code, and record the synchronization mark and the synchronization pull-in mark in a portion corresponding to a head part of the second error correction code. In this case, a flag is prevented from being unnecessarily raised by arranging the synchronization mark and the synchronization pull-in mark in the head part in a transverse direction of the error correction.

Additionally, there is provided according to another aspect of the present invention an information recording apparatus for recording information on a recording medium at a multi-value level, comprising means for recording a clock mark, a synchronization mark and a synchronization pull-in mark when recording the information on said recording medium, the clock mark for extracting a clock when reproducing the information from said recording medium, the synchronization mark for detecting a bit-slip on a recording medium, the synchronization pull-in mark for pulling in a phase synchronization at a position immediately after the synchronization mark.

According to the above-mentioned information recording apparatus, since the synchronization pull-in mark for pulling in a phase synchronization by the mark recording means is recorded immediately after the synchronization mark, if a clock phase deviation is generated when reproducing, the phase deviation can be recovered early by using the synchronization pull-in mark, and an error due to signal missing or the like is minimized.

Additionally, there is provided according to another aspect of the present invention a recording medium on which a clock mark, a synchronization mark and a synchronization pull-in mark as mark information are recorded thereon, the clock mark for extracting a clock when reproducing the information recorded, the synchronization mark for detecting a bit-slip, the synchronization pull-in mark for pulling in a phase synchronization at a position immediately after the synchronization mark.

According to the above-mentioned invention, since the synchronization pull-in mark for pulling in a phase synchronization is recorded immediately after the synchronization mark, if a clock phase deviation is generated when reproducing, the phase deviation can be recovered early by using the synchronization pull-in mark, and an error due to signal missing or the like is minimized. Additionally, reliability of recorded data can be raised.

There is provided according to another aspect of the present invention an information reproducing method for detecting, when reproducing the above-mentioned recording medium, the bit-slip based on the synchronization mark and performing a synchronization detection of a clock and matching a phase based on the synchronization pull-in mark.

According to the above-mentioned information reproducing method, even if a clock phase deviation is generated when reproducing the recording medium, the phase deviation can be recovered early by using the synchronization pull-in mark recorded immediately after the synchronization mark, and an error due to signal missing or the like is minimized.

Additionally, there is provided according another aspect of the present invention, an information reproducing apparatus for reproducing the above-mentioned recording medium, comprising mark information processing means for detecting the bit-slip based on said synchronization mark and performing a synchronization detection of a clock and matching a phase based on the synchronization pull-in mark.

According to the above-mentioned information reproducing apparatus, even if a clock phase deviation is generated when reproducing the recording medium, the phase deviation can be recovered early by using the synchronization pull-in mark recorded immediately after the synchronization mark, and an error due to signal missing or the like is minimized.

In the above-mentioned information reproducing apparatus, a PLL circuit (phase-locked loop circuit) that performs a synchronization pull-in process may be provided, wherein the mark information processing means may raise a loop gain of the PLL circuit higher than other portions in a portion of the synchronization pull-in mark. In this case, since the loop gain of the PLL circuit is increased in the part of the synchronization pull-in mark, a phase deviation can be recovered early.

Additionally, in the above-mentioned information reproducing apparatus, a PLL circuit (phase-locked loop circuit) that performs a synchronization pull-in process may be provided, wherein the mark information processing means may raise a loop gain of the PLL circuit higher than other portions under a condition where the bit-slip is detected. In this case, since the loop gain of the PLL circuit is increased in the part of the synchronization pull-in mark, a phase deviation can be recovered early.

Other objects, features and advantages of the present invention will become more apparent from the following detailed description when read in conjunction with the accompanying drawings.

DETAILED DESCRIPTION OF THE PREFERRED EMBODIMENTS

First Embodiment

A description will be given below, with reference to FIG. 1 through 11, of a first embodiment of the present invention.

Figure 1:
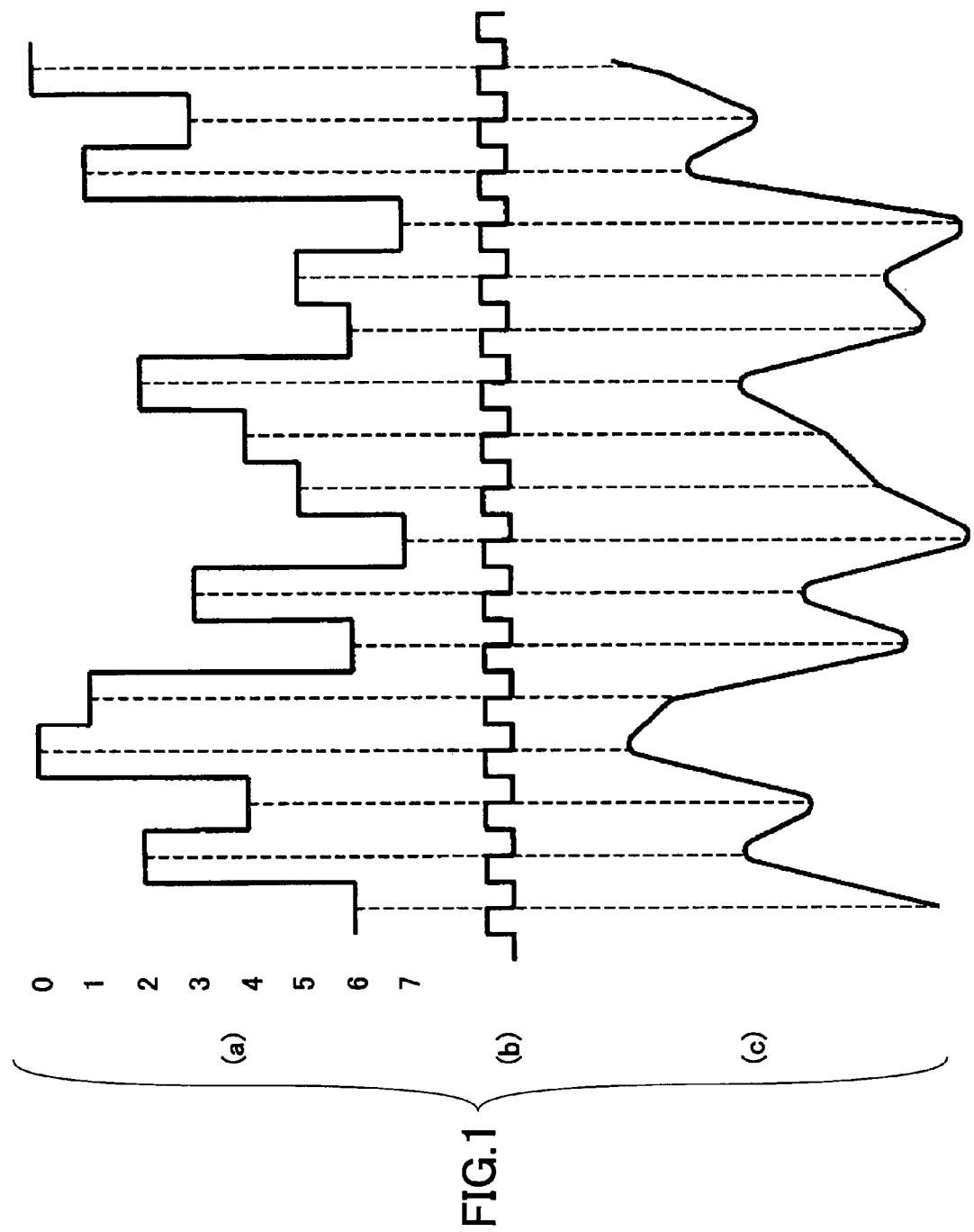
FIG. 1 is a waveform chart showing an example of a reproduction waveform of multi-value recording.

FIG. 1 is a waveform chart showing an example of a reproduction waveform of multi-value recording. FIG. 1-($a$) shows an ideal value of the octal reproduction waveform, and FIG. 1-($b$) shows a waveform of the ideal reproduction clock. A voltage of the reproduction waveform changes to a square waveform at a rising of the reproduction clock, and a level can be determined stably at falling of the clock. FIG. 1-($c$) shows an actual reproduction waveform.

Figure 2:
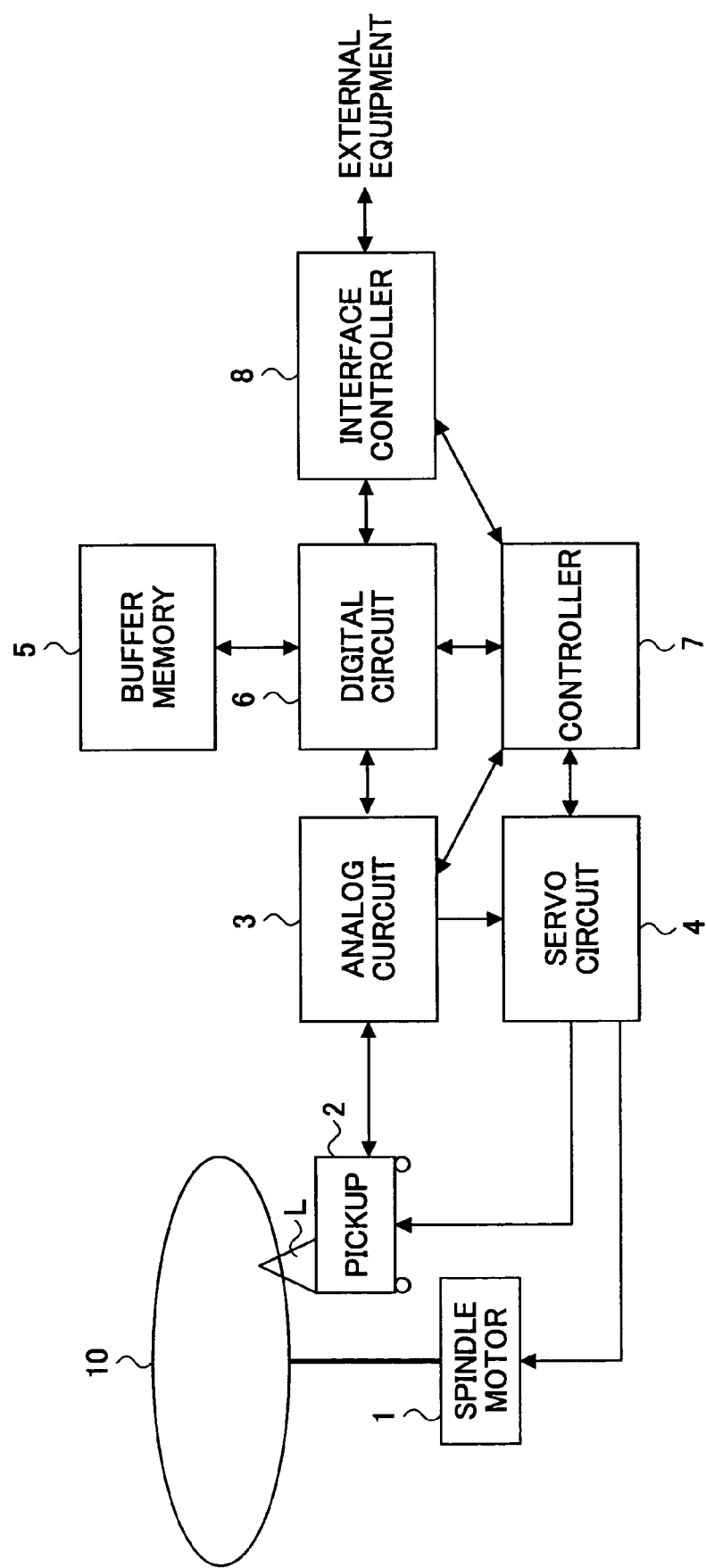
FIG. 2 is a block diagram showing a structure of an optical disc apparatus according to a first embodiment of the present invention.

FIG. 2 is a block diagram showing a structure of an optical disc apparatus according to the first embodiment of the present invention. Parts relating to the present invention are shown in FIG. 2 so as to show a minimum structure necessary for implementing the present invention.

In the optical disc apparatus (optical disc drive) shown in FIG. 2, when an interface controller 8 receives a command from an external equipment (for example, a personal computer), the interface controller 8 notifies a controller 7 of the reception of the command.

The controller is constituted by a microcomputer comprising a CPU, a ROM, a RAM, etc., and performs a control of the entirety of the optical disc apparatus. Additionally, the controller 7 interprets the command from the interface controller 8, and performs an operation requested by the command. Then, the controller 7 sends a result of the operation requested by the command as a report to the external equipment through the interface controller 8. Additionally, the controller 7 performs a control process of an information recording method and an information reproducing method according to the present invention.

An optical disc 10 is a computer-readable recording medium (optical information medium) such as a CD-R disc, a CD-RW disc, a DVD+R disc, a DVD+RW disc or the like having a data structure according to the present invention.

When recording information on the optical disc 10, the information sent from the external equipment (data to be recorded on the optical disc 10) is temporarily stored in a buffer memory 5 through the interface controller 8 and via a digital circuit 6.

The digital circuit 6 performs an operation such as adding an error correction code, adding a synchronization signal or converting into a modulation code of a multi-value level with respect to the information store in the buffer memory 5. Additionally, an address previously written on the optical disc 10 is read, and the information is recorded at the designated address.

When recording information on the optical disc 10 at the multi-value level, a semiconductor laser light-source LD (illustration is omitted since it is publicly known) is caused to emit a light while controlling a current supplied to the semiconductor laser light-source on a pickup (PU) 2 by an analog circuit 3.

Additionally, in the pickup 2, a reflected light of an emitted light form LD reflected by the optical disc 10 is received by a light-receiving element PD (illustration is omitted since it is publicly known) and processed by the analog circuit 3 so as to generate a focus error signal and a tracking error signal and input them to a servo circuit 4 so as to control a position of the pickup 2 and a position of a lens (illustration is omitted since it is publicly known) by the servo circuit 4.

The optical disc 10 normally has a spiral groove or data arrangement. Thereby, when the optical disc 10 is rotated, the groove or the data arrangement moved from an inner circumference to an outer circumference (or, may be from outer circumference to an inner circumference) with passage of time. Thus, a control, which is referred to as carrier tracking, is performed so that a position of a lens of the pickup 2 can be always at a position close to a neutral position, by moving the entire pickup 2 based on the tracking servo signal.

When reproducing information recorded on the optical disc 10, the output data of the pickup 2 is quantized by the analog circuit 3, and a clock extraction is performed using a PLL or the like. The data is subjected to a synchronization detection, a demodulation, an error correction, etc., by the digital circuit 6 and is stored in the buffer memory 5. Thereafter, the data stored in the buffer memory 5 is transferred to the external equipment through the interface controller 8.

Figure 3:
FIG. 3 is an illustration showing a general format of an arrangement of information recorded on an optical disc.

FIG. 3 is an illustration showing a general format of an arrangement of information recorded on an optical disc. In the information recorded on the optical disc, the clock mark and the data are arranged alternately.

In a case of recording multi-value data on the optical disc, since an edge part of a reproduction signal cannot be correctly extracted unlike binary data, the clock cannot be extracted from the edge part. Thus, a special mark referred to as a clock mark is recorded separate from an information part where data is recorded so as to extract a clock from the clock marks.

The length (data length) of the clock mark is set so that an amount of clock fluctuation caused by an eccentricity of the optical disc or the like is within an allowable value of the system. A pattern receiving no influence from preceding or proceeding data is used for the clock mark. Additionally, it is necessary to prevent an erroneous synchronization form being generated even if the position of the clock mark fluctuates.

Figure 4:
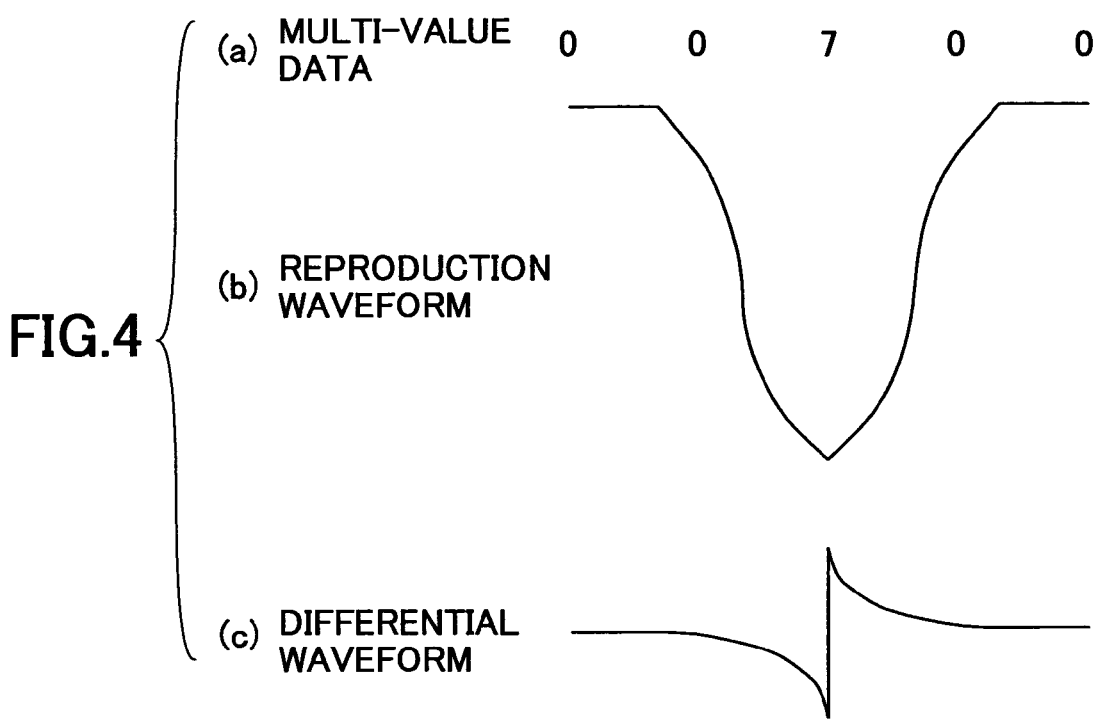
FIG. 4 is a diagram of an example of a clock mark according to the first embodiment of the present invention.

FIG. 4 is an illustration showing an example of the clock mark according to the present embodiment. The clock mark shown in FIG. 4 is a data row "00700", where when recording information according to octal value, one having a larger amount of reflected light is set to 0 and one having a smaller amount of light is set to 7, as shown in FIG. 4-(*a*). FIG. 4-(*b*) shows a waveform of a reproduction signal when reproducing the data row shown in FIG. 4-(*a*). Additionally, FIG. 4-(*c*) shows a differential waveform obtained by differentiating the reproduction signal. A detection of a synchronization position can be performed based on a zero-cross in the differential waveform. A clock can be generated by inputting the detected synchronization positions to a phase comparator of a PLL circuit.

Figure 5:
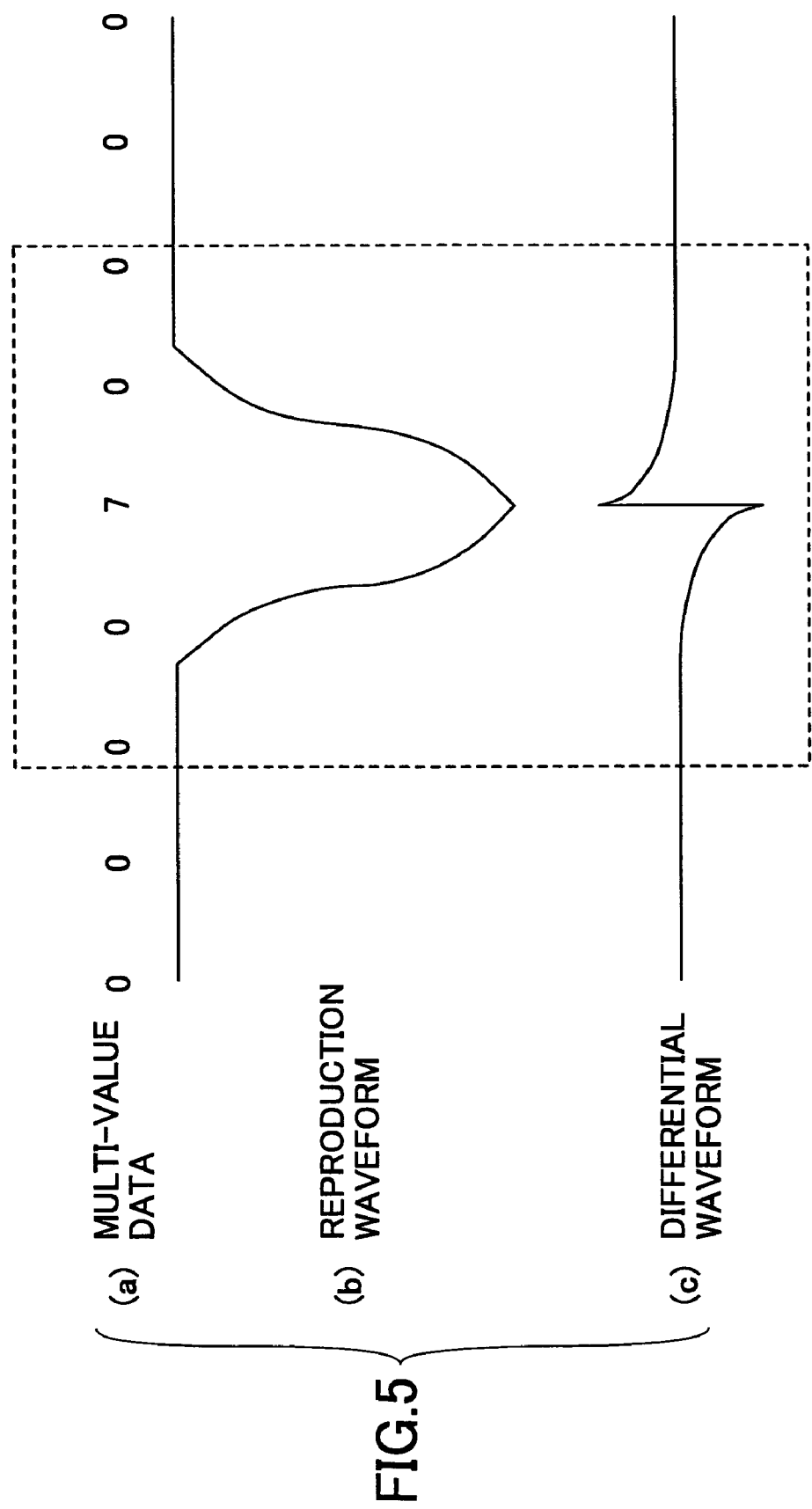
FIG. 5 is a diagram of an example of a synchronization mark according to the first embodiment of the present invention.

FIG. 5 is an illustration showing an example of the synchronization mark according to the first embodiment of the present invention.

Similar to the above-mentioned clock mark, the synchronization mark corresponds to a data row "000070000", where when recording information according to octal value, one having a larger amount of reflected light is set to 0 and one having a smaller amount of light is set to 7, as shown in FIG. 5-(*a*). FIG. 5-(*b*) shows a waveform of a reproduction signal when reproducing the data row shown in FIG. 5-(*a*). In the synchronization mark, the pattern encircled by dotted lines in FIG. 5 is identical to the above-mentioned clock mark.

Additionally, FIG. 5-(*c*) shows a differential waveform obtained by differentiating the reproduction signal. A detection of a synchronization position can be performed by zero-cross in the differential waveform. The reason for the synchronization mark being longer than the above-mentioned clock mark is that a larger window is needed since a fluctuation to recover a bit-slip generated by a defect or the like is larger than the clock mark.

Figure 6:
FIG. 6 is an illustration showing a format when causing information to be recorded on the optical disc to contain the synchronization mark together with the clock mark.

FIG. 6 is an illustration showing a format when the information recorded on the optical disc is caused to contain the synchronization mark together with the clock mark. In the example shown in FIG. 6, the clock marks are arranged at an equal interval, and data and the synchronization mark are arranged therebetween.

Next, a description will be given of an information recording process performed in the above-mentioned optical disc apparatus. Although the information recording process is performed by a function of each part of the optical disc apparatus under a control of the controller 7, a description will be given on the assumption that it is performed by the controller 7.

The controller 7 functions as means for recording the clock mark shown in FIG. 4 and the synchronization mark shown in FIG. 5 so as to record on the optical disc 10 the clock mark, which is for extracting a clock when reproducing the information, and the synchronization mark, which is for detecting a bit-slip, so tat a part of the synchronization mark is identical to the clock mark. As for the recording of the synchronization mark and the clock mark, recording of each level may be performed similar to regular data recording.

In the present embodiment, communization of the clock mark and the synchronization mark is achieved by using the patterns of the clock mark shown in FIG. 4 and the synchronization mark shown in FIG. 5. That is, it becomes possible to cause the synchronization mark to have the function of the clock mark by making a part of the synchronization mark to have the same pattern as the clock mark. Accordingly, a redundancy of data can be decreased, and an amount of data recordable on a single optical disc can be increased.

Additionally, the controller 7 controls, when performing the above-mentioned recording process, so that a position of the clock mark in the synchronization mark and positions of other clock marks is at an equal interval.

Figure 7:
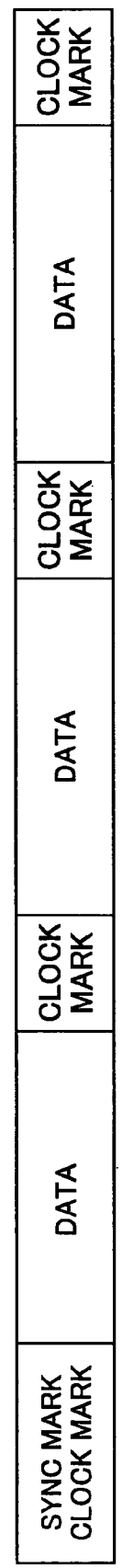
FIG. 7 is an illustration showing a format when causing information to be recorded on the optical disc to contain the synchronization mark together with the clock mark.

FIG. 7 is an illustration showing a format when the information recorded on the optical disc is caused to contain the synchronization mark together with the clock mark. As shown in FIG. 7, a part corresponding to the clock mark in the synchronization mark is arranged so that a positional relationship with other clock marks is an equal interval, thereby simplifying generation of a clock.

Further, the controller 7 performs recording, when recording information by multi-value information according to the above-mentioned recording process, by making the clock mark to be a combination of a first level at which the reproduction signal is maximized and a second level at which the reproduction signal is minimized.

As shown in FIG. 4, using the par "070" of the clock mark, the position of the level "7" at which amplitude is maximized can be a position of the clock.

Additionally, the controller 7 records, when performing the above-mentioned recording process, so that equal to or more than two pieces of the same level are consecutive at the beginning and ending of the clock mark.

As shown in FIG. 4, in order to avoid a change in the reproduction signal due to inter-code interference of values of both sides of "070" in the clock mark, "0" is provided on both sides of "070" (that is, "0" is provided at the beginning and ending) so as to make the data row to be "00700". By causing the same level to be consecutive in front and rear, a change in the reproduction signal due to an inter-code interference can be avoided.

If the reproduction signal is interrupted by a defect or the like, the detection of the clock cannot be performed, and the clock is set in a self-advancing state. If the defect is long, a bit-slip is generated, which results in that the subsequent data cannot be reproduced.

Thus, since it is recovered from the bit-slip by using the synchronization mark, the controller 7 corrects an error by using two kinds of error correction codes of a first and a second when performing the above-mentioned recording process, and records information in a direction of an error correction according to the first error correction code and records the synchronization mark in a part corresponding to a head of the second error correction code.

Figure 8:
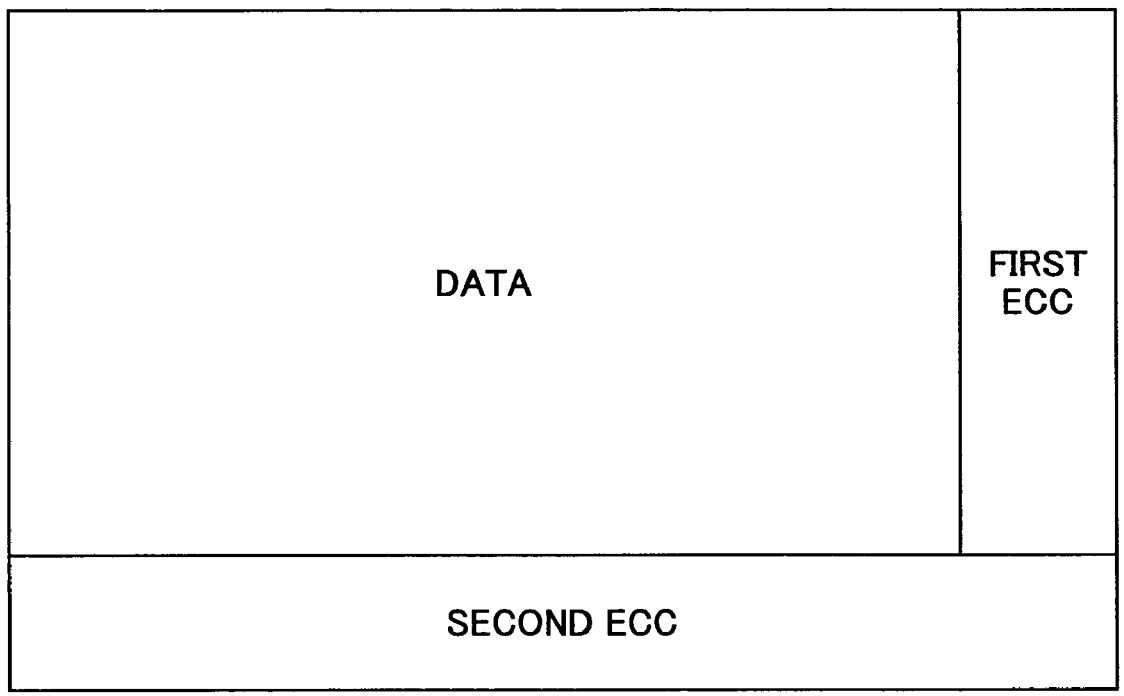
FIG. 8 is an illustration for explaining a normal error correction.
Figure 9:
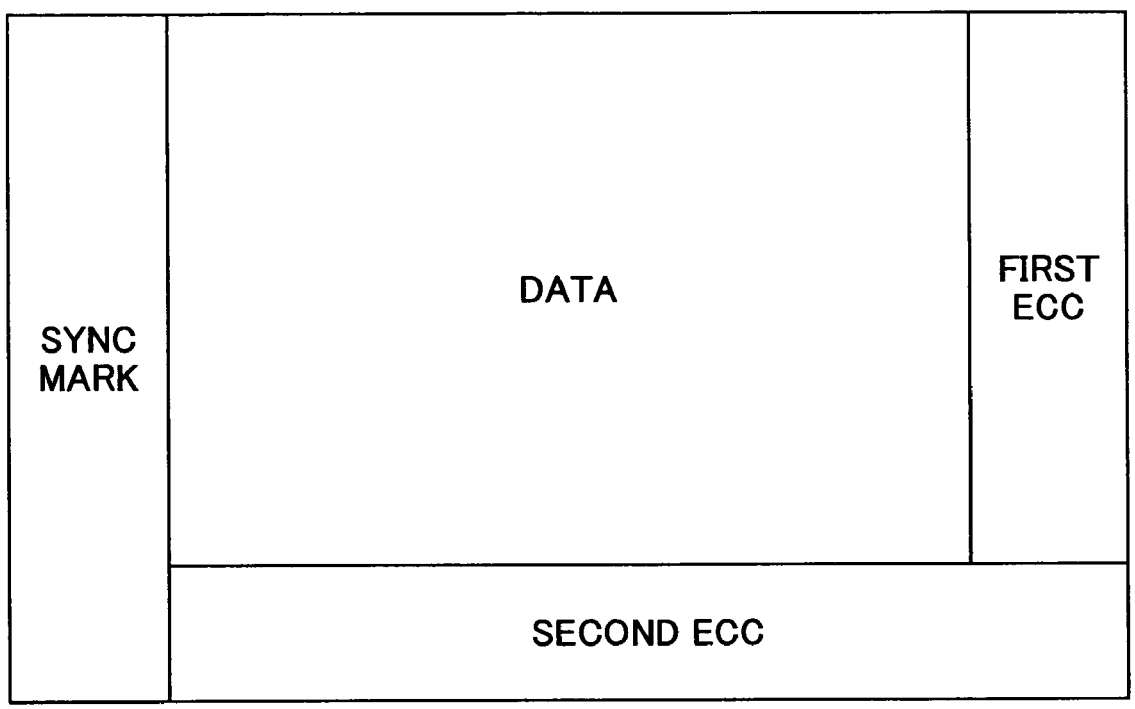
FIG. 9 is an illustration showing an example in which a synchronization mark is arranged in a portion (head portion) corresponding to a head of a second error correction code in a transverse direction.

FIG. 8 is an illustration for explaining a normal error correction. FIG. 9 is an illustration for explaining an error correction according o the first embodiment of the present invention.

As shown in FIG. 8, the first error correction code is added I a transverse direction (on the right-hand side of "data" in the figure), and the data (information9 is sequentially recorded from an upper left corner in the figure in a transverse direction (rightward direction in the figure).

Here, although, if a defect occurs, errors may be generated consecutively in the transverse direction, the errors are corrected by the second error correction code in a longitudinal direction. A technique referred to as an erasure correction is used for the error correction. Although a flag is used in the correction, the correction cannot be done if there are many flags. Thus, as shown in FIG. 9, the synchronization mark is arranged in a part (head part) corresponding to a head of the second error correction code, which is in the transverse direction of the data. By arranging the synchronization mark in the head part in the transverse direction of the error correction, the flag is prevented from being easily raised.

Next, a description will be given of an information reproducing process performed by the optical disc apparatus. Although the information reproducing process is performed by a function of each part of the optical disc apparatus under a control of the controller 7, a description will be given below on the assumption that it is performed by the controller 7.

The controller 7 functions as means for reproducing the optical disc on which information is recorded according to the above-mentioned information recording process, means for detecting a bit-slip and also performing a synchronization detection of a clock when reproducing the optical disc on which the above-mentioned clock mark and the above-mentioned synchronization mark are recorded in the information, and means for providing separately a window for detecting the above-mentioned bit-slip and a window for the above-mentioned synchronization detection of the clock.

The controller 7 reproduces, based on the synchronization mark and the clock mark, the information from the optical disc on which the information, the clock mark for extracting the clock when reproducing the information and the synchronization mark for detecting a bit-slip are recorded so that a part of the synchronization mark is identical to the pattern of the clock mark, and provides the clock mark window for detecting a bit-slip and the synchronization mark window for the synchronization detection of the clock so as to detect the bit-slip by the synchronization mark and also perform the synchronization detection of the clock.

Figure 10:
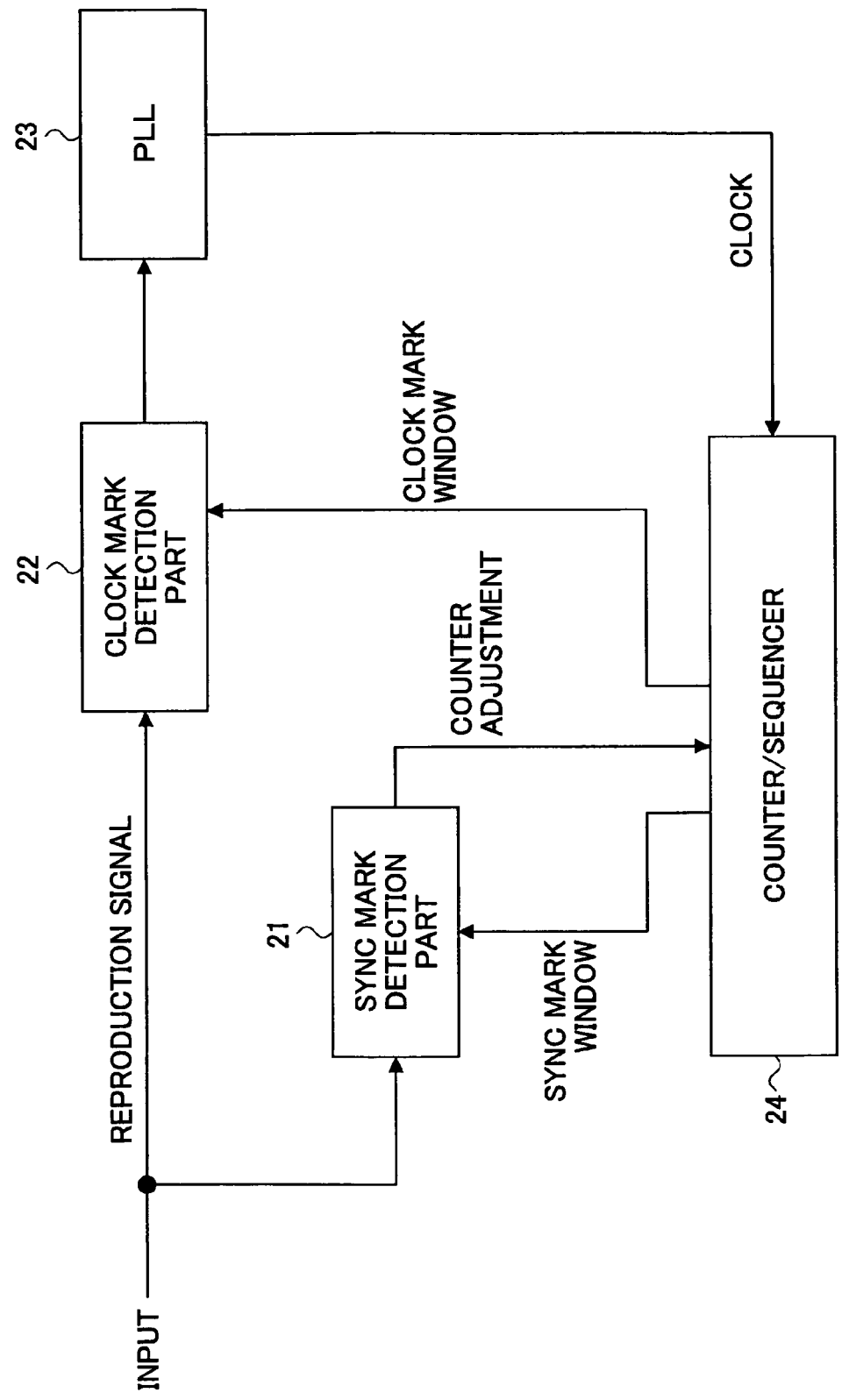
FIG. 10 is a block diagram showing a structure relating to information reproduction in the optical disc apparatus shown in FIG. 2.

FIG. 10 is a block diagram showing a structure relating to the information reproduction in the optical disc apparatus shown in FIG. 2.

As shown in FIG. 10, the reproduction signal (reproduction waveform) is input to the clock mark detection part 22 and the synchronization mark detection part 21. However, in order to prevent an erroneous synchronization from being made during data period, a counter/sequencer 24 produces each window and supplies to the synchronization mark detection part 21. That is, the synchronization mark window is generated by a counter and is supplied to the synchronization mark detection part 21, and the clock mark window is generated by a sequencer and is supplied to the clock mark detection part 22.

After detection of the clock by the clock mark detection part 22, the clock of cell unit is generated by a phase-locked loop circuit (PLL) and is subjected to a phase comparison. Additionally, after the synchronization detection is performed by the synchronization mark detection part 21, a value of the counter is set to a designated value. Further, the clock of cell unit generated by the PLL 23 is output to the counter.

Since the clock mark is "00700", there is a possibility of generation of an erroneous synchronization depending on what on the both sides. A worst value is a case where "007" is arranged on the front side and "700" is arranged on the rear side.

Figure 11:
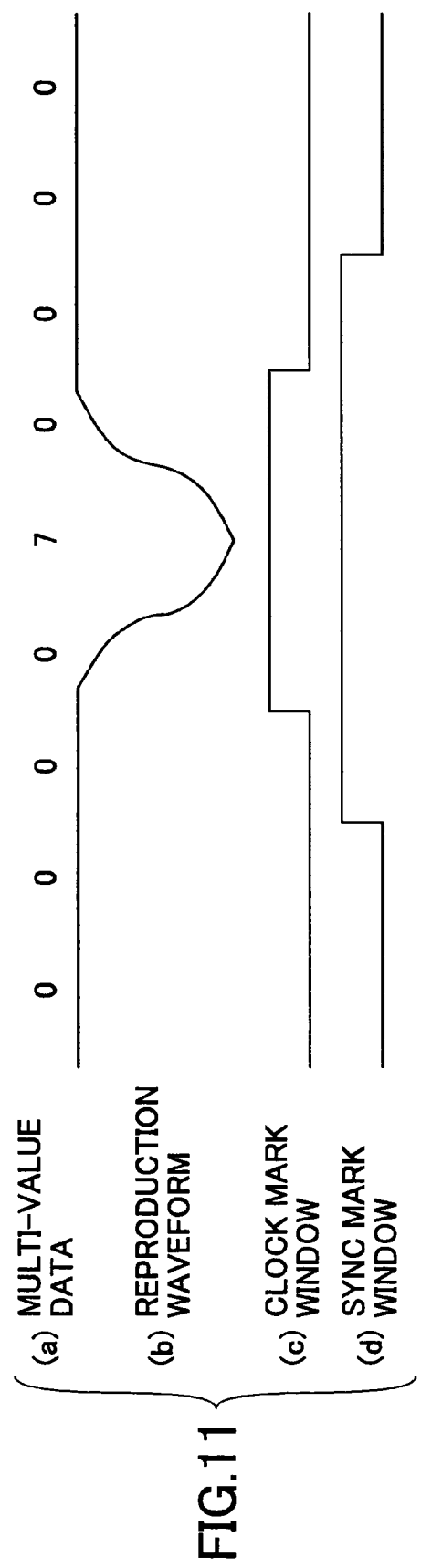
FIG. 11 is a timing chart of outputting a clock mark window and a synchronization mark window.

FIG. 11 is a timing chart of outputs of the clock mark window and the synchronization mark window.

As shown in FIG. 11-(c), an erroneous synchronization can be prevented by providing the clock mark window corresponding to a total of three cells in the front and rear with "7" of the clock mark at the center. Similarly, with respect to the synchronization mark, the synchronization mark window corresponding to five cells may be provided as shown in FIG. 11-(d). As mentioned above, an erroneous synchronization can be prevented by providing windows separately for the synchronization mark and the clock mark.

Next, a description will be given of an optical disc recorded by the above-mentioned information recording method.

The data having a structure comprising the information, the clock mark and the synchronization mark are recorded on the optical disc 10 by the above-mentioned information recording methods. By recording the data as mentioned above, reliability of the data is increased. Especially, a recovery can be made after a defect is generated. Thus, by making a part of the synchronization mark to have the same pattern as the clock mark, a redundancy is reduced by providing the function of the clock mark to the synchronization mark so as to provide a recording medium having high reliability of data.

Although the optical disc was explained as a recording medium in the above-mentioned first embodiment, the information recording method, the information reproducing method, the information recording apparatus and the information recording apparatus according to the present invention are not limited by a recording method of the recording medium. That is, the present invention is applicable to a magneto-optical recording medium, a recordable recording medium and a rewritable recording medium, and effects the same as the above-mentioned effects can be obtained.

Second Embodiment

Next, a description will be given, with reference to FIG. 12 through FIG. 14, of a second embodiment of the present invention. It should be noted that a structure of the optical disc apparatus according to the present embodiment is the same as the optical disc apparatus according to the first embodiment shown in FIG. 2, and a description thereof will be omitted.

Figure 12:
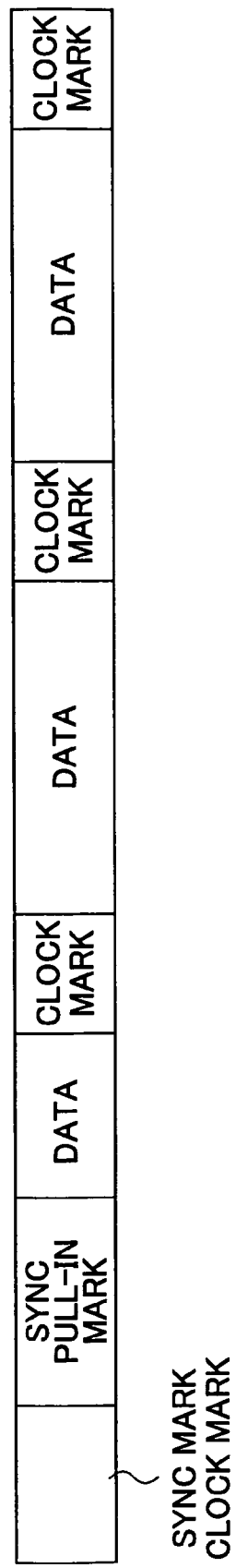
FIG. 12 is an illustration showing a format of information to be recorded on an optical disc according to a second embodiment of the present invention.

A format of information recorded on the optical disc 10 according to the second embodiment of the present invention is shown in FIG. 12. In the format according to the present embodiment shown in FIG. 12, a synchronization pull-in mark for pulling in a phase synchronization is arranged at a position immediately proceeding the synchronization mark since it is considered that a synchronization of a phase is deviated when a bit-slip is detected. Although, the example shown in FIG. 12 is indicated as an application example to the format shown in FIG. 7, it is also applicable to the example of the format of FIG. 6. Of course, the bit-slip detection and the clock detection can be performed simultaneously by a single mark when it is applied to the example of the format of FIG. 7 and a redundancy can be decreased, and, thereby, it is advantageous in adding the synchronization pull-in mark as in the present embodiment.

Figure 13:
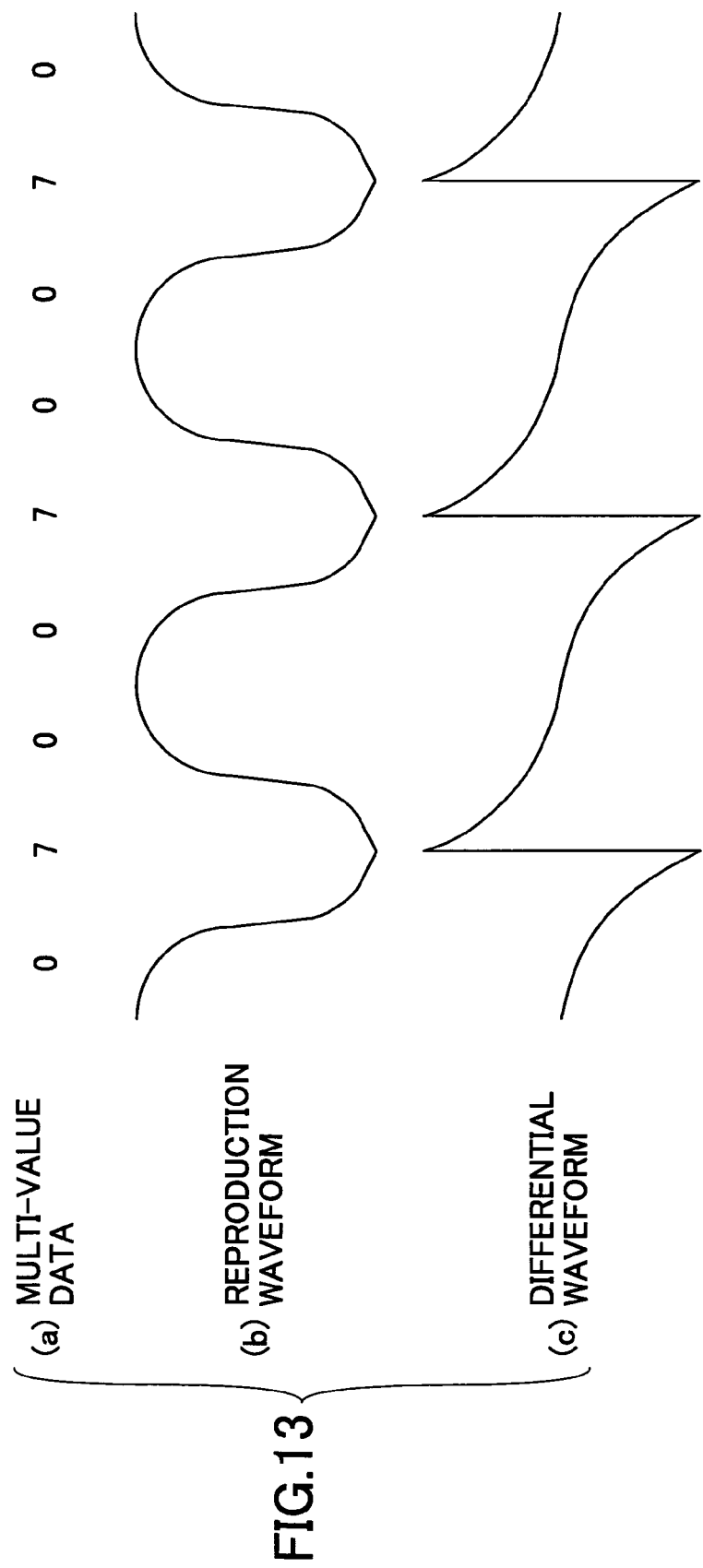
FIG. 13 is an illustration of an example of a synchronization pull-in mark.

FIG. 13 is an illustration showing an example of the synchronization pull-in mark. The pull-in mark is required so that a signal is easily detected and having a resistance to noise. Thus, in the present embodiment, it is a pattern example such as a data row "070070070" of a combination of first and second levels, where in a range where a maximum amplitude is acquired at a multi-level, that is, when recording information by multi-value of octal value as shown in FIG. 13-(a), one having a larger amount of reflected light is set to the first level "0" and one having a smaller amount of reflected light is set to the second level "7". FIG. 13-(b) shows an example of a waveform of the reproduction signal when reproducing, and FIG. 13-(c) shows a differential waveform when the reproduction waveform is differentiated. According to the differential waveform, it can be appreciated that a synchronization pull-in can be performed at zero-cross thereof.

Additionally, in order to increase a number of times of phase comparison, it is advantageous that the synchronization pull-in mark has a large number of parts (parts of level 7 in FIG. 13) which can be compared with. However, if high-density recording is performed, the reproduction signal becomes small due to an inter-code interference and it becomes hardly detected. Thus, the combination pattern of the synchronization pull-in mark is a pattern in which a plurality of pieces of one of the first level "0" and the second level "7" are provided between the other one of the first level "0" and the second level "7", and a number of pieces is set to be a number which does not cause a reduction in amplitude due to an inter-code interference. In the example shown in FIG. 13, each two first levels "0" are combined between the second levels "7".

In the meantime, as explained in the above-mentioned first embodiment, if the reproduction signal is interrupted due to a defect or the like, a detection of the clock cannot be performed and the clock is in a self-advancing state. If such a defect is long, a bit-slip may occur. If a bit-slip occurs, subsequent data cannot be reproduced.

Thus, in order to recover from the bit-slip by using the synchronization mark, as explained with reference to FIG. 8, when performing the recording process, an error is corrected by using two kinds of error correction codes, that is, the first error correction codes and the second error correction codes, and information is recorded in a direction of the error correction according to the first error correction code, and the synchronization mark is recorded in a part corresponding to a head of the second error correction code.

Figure 14:
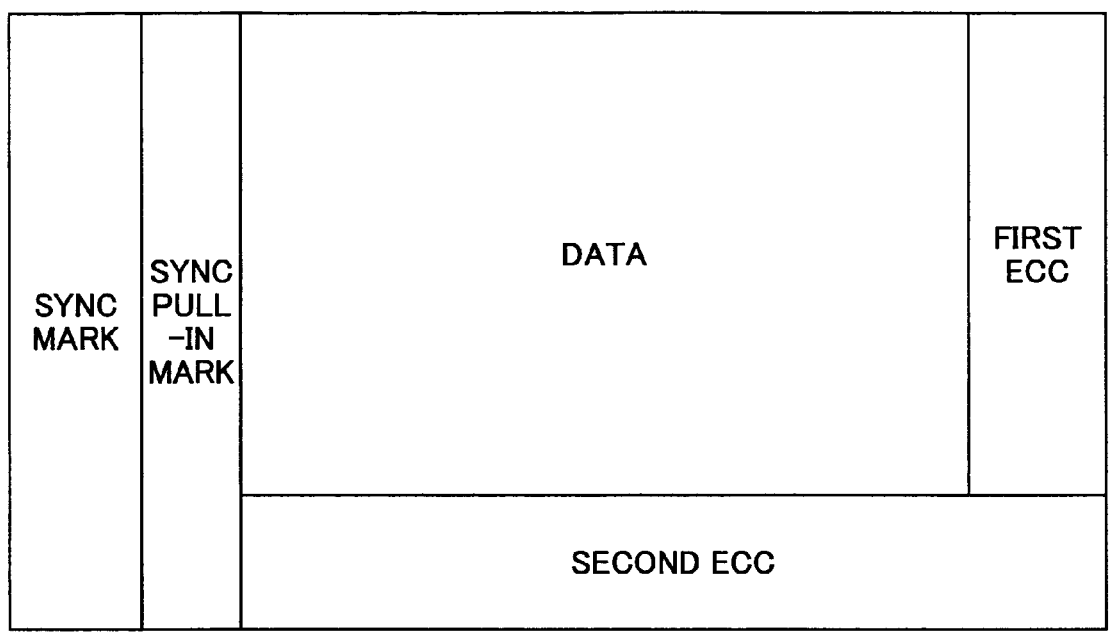
FIG. 14 is an illustration for explaining an error correction according to the second embodiment of the present invention.

FIG. 14 is an illustration for explaining an error correction according to the present embodiment. In the present embodiment, the synchronization mark is arranged in a part corresponding to a head of the second error correction code which is a transverse direction of data as shown in FIG. 14, and the synchronization pull-in mark for pulling in a phase synchronization is arranged at a position immediately after the synchronization mark.

According to the optical disc apparatus shown in FIG. 2, the clock mark, the synchronization mark and the synchronization pull-in mark can be recorded on or reproduced from the optical disc 10 in accordance with the format such as shown in FIG. 12 or FIG. 14.

That is, describing the information recording process in the optical disc apparatus, the controller 7 functions as mark recording means for recording in information the clock mark such as shown in FIG. 4, the synchronization mark such as shown in FIG. 5 and the synchronization pull-in mark such as shown in FIG. 13 in accordance with the format shown in FIG. 12 or FIG. 14. Thereby, using the function of the mark recording means, information, the clock mark for extracting a clock when reproducing the information, the synchronization mark for detecting a bit-slip and the synchronization pull-in mark for pulling in a phase synchronization are recorded on the optical disc 10. The synchronization pull-in mark is recorded so as to be at a position immediately after the synchronization mark. In this case, the recording process itself may by performed by recording of each level in the same manner as the case of regular data recording.

The reproducing process is performed under a structure such as shown in FIG. 10. As shown in FIG. 10, the reproduction signal (reproduction waveform) is input to the clock mark detection par 22 and the synchronization mark detection part 21. However, in order to prevent an erroneous synchronization from being made during data period, the counter/sequencer 24 produces and supplied each window. That is, the synchronization mark window is generated by a counter part and is supplied to the synchronization mark detection part 21, and the clock mark window is generated by a sequencer part and is supplied to the clock mark detection part 22.

After detection of the clock by the clock mark detection part 22, the clock of cell unit is generated by the PLL 23 and is subjected to a phase comparison. Additionally, after the synchronization detection is performed by the synchronization mark detection part 21, a value of the counter is set to a designated value. Further, the clock of cell unit generated by the PLL 23 is output to the counter. At this time, the window of the clock mark detection part 22 is also opened in a part of the synchronization pull-in mark so as to perform a phase comparison by the PLL circuit 23. Further, the window may be output only when a bit-slip occurs by using a counter adjustment signal, which is output when a bit-slip is detected by the synchronization mark detection part 22, or may be output continuously.

Additionally, in order to festinate the synchronization pull-in of the PLL circuit 23, it is possible to synchronize earlier by increasing a loop gain of the PLL circuit 23 in the portion of the synchronization pull-in mark. Additionally, according to this combination, the loop gain may be increased in the part of the synchronization pull-in mark only in a case where a bit-slip is detected.

The present invention is not limited to the above-mentioned specifically disclosed embodiments, and variations and modifications may be made without departing from the scope of the present invention.

What is claimed is:

1. An information recording method comprising: providing a recording medium; and subsequently, using a laser to record information, a clock mark and a synchronization mark on said recording medium, wherein said information, said clock mark and said synchronization mark are formed of multi-level data with more than two levels, and wherein the clock mark is arranged for extracting a clock when reproducing the information, the synchronization mark is arranged for detecting a bit-slip on the recording medium, and a part of said synchronization mark is identical to a pattern of said clock mark so that the part of the synchronization mark has the function of the clock mark.

2. An information reproducing method comprising:
providing a recording medium that has information, a clock mark and a synchronization mark recorded thereon, and wherein said information, said clock mark and said synchronization mark are formed of multi-level data with more than two levels; and
reproducing said information, said clock mark and said synchronization mark from said recording medium, and
wherein the clock mark is recorded for extracting a clock when reproducing the information, the synchronization mark is recorded for detecting a bit-slip on the recording medium, and a part of said synchronization mark is identical to a pattern of said clock mark so that the part of the synchronization mark has the function of the clock mark, and said information being based on said synchronization mark and said clock mark, and
wherein said method further comprises the steps of detecting said bit-slip by said synchronization mark and also performing a synchronization detection of said clock.

3. The information recording method as claimed in claim 1, wherein recording is performed so that said synchronization mark contains the clock mark and a position of the clock mark contained in said synchronization mark and positions of other clock marks are at equal interval.

4. The information recording method as claimed in claim 1, wherein said information is recorded by multi-value information so that said clock mark is made as a combination of a first level and a second level, the first level causing a reproduction signal to be largest, the second level causing the reproduction signal to be smallest.

5. The information recording method as claimed in claim 4, wherein recording is performed so that the same level continues for equal to or more than two pieces in beginning and ending of said clock mark.

6. The information recording method as claimed in claim 1, comprising correcting an error using first and second error correction codes, recording information in a direction of an error correction according to the first error correction code, and recording the synchronization mark in a portion corresponding to a head part of the second error correction code.

7. An information recording apparatus comprising; a device for supporting a rotating recording medium; and a laser for recording information, a clock mark and a synchronization mark on the rotating recording medium, wherein said information, said clock mark and said synchronization mark are formed of multi level data with more than two levels, and wherein the clock mark is recorded for extracting a clock when reproducing the information, the synchronization mark is recorded for detecting a bit-slip on the recording medium, and a part of said synchronization mark is identical to a pattern of said clock mark so that the part of the synchronization mark has the function of the clock mark, and wherein the information recording apparatus comprises means for recording said clock mark and said synchronization mark in said information.

8. An information reproducing apparatus comprising:
a device for supporting a recording medium; and
wherein said information reproducing apparatus is arranged for reproducing information, a clock mark and a synchronization mark from the recording medium, and wherein said information, clock mark and synchronization mark are in the form of multi-level data containing more than two levels, and wherein the clock mark is recorded for extracting a clock when reproducing the information, the synchronization mark is recorded for detecting a bit-slip on the recording medium, and a part of said synchronization mark is identical to a pattern of said clock mark so that the part of the synchronization mark has the function of the clock mark, and
wherein the information reproducing apparatus comprises means for detecting a bit-slip by said synchronization mark and also performing a synchronization detection of a clock when reproducing the recording medium having information in which said clock mark and said synchronization mark are recorded in the information.

9. The information reproducing apparatus as claimed in claim 8, comprising means for separately providing a window for detecting said bit-slip and a window for the synchronization detection of said clock.

10. A computer-readable recording medium on which data having a structure comprising a clock mark and a synchronization mark that are recorded on said recording medium by an information recording method for recording information, the clock mark and the synchronization mark on said recording medium, and wherein said information, said clock mark and said synchronization mark are in the form of multi-level data with more than two levels, and wherein the clock mark is recorded for extracting a clock when reproducing the information, the synchronization mark is recorded for detecting a bit-slip on the recording medium, and a part of said synchronization mark is identical to a pattern of said clock mark so that the part of the synchronization mark has the function of the clock mark.

11. The information recording method as claimed in claim 1, comprising correcting an error using a first error correction code and a second error correction code, recording information in a direction according to said first error correction code, and recording said synchronization mark and a synchronization pull-in mark in a portion corresponding to a head part of said second error correction code.

* * * * *

UNITED STATES PATENT AND TRADEMARK OFFICE
CERTIFICATE OF CORRECTION

PATENT NO. : 7,652,966 B2
APPLICATION NO. : 11/259274
DATED : January 26, 2010
INVENTOR(S) : Yuichi Kadokawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Twenty-eighth Day of December, 2010

David J. Kappos
*Director of the United States Patent and Trademark Office*